Nov. 19, 1968          C. M. BARRACK ET AL          3,412,389
                     COMPARATOR ARRANGEMENT
Original Filed July 31, 1962                      3 Sheets-Sheet 1

CARROLL M. BARRACK
WILBUR A. VISHER
*INVENTORS*

*ATTORNEY*

CARROLL M. BARRACK
WILBUR A. VISHER
INVENTORS

ATTORNEY

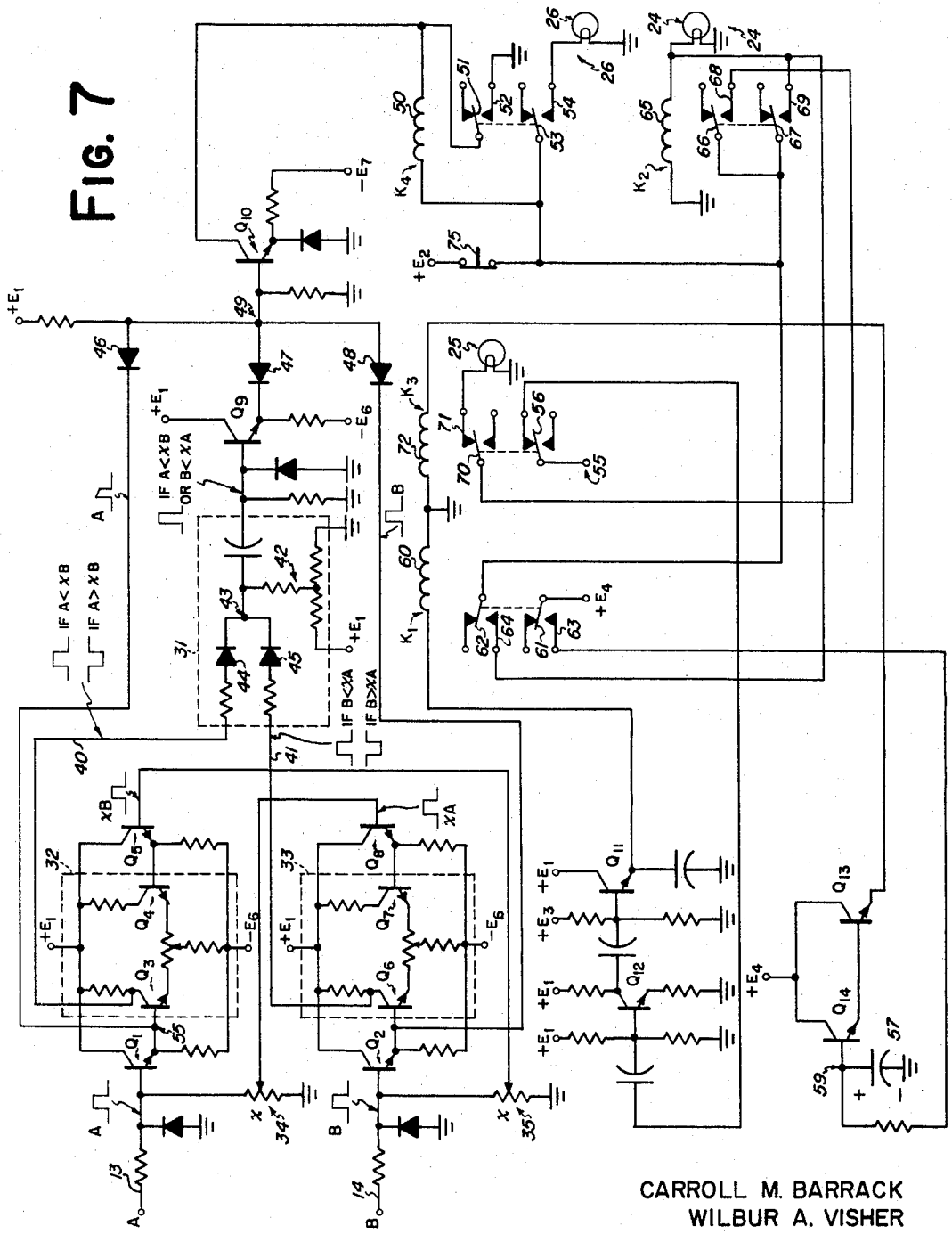
CARROLL M. BARRACK
WILBUR A. VISHER
INVENTORS
ATTORNEY

United States Patent Office 3,412,389
Patented Nov. 19, 1968

3,412,389
COMPARATOR ARRANGEMENT
Carroll M. Barrack, Pikesville, Md., and Wilbur A. Visher, Fort Washington, Pa., assignors to AAI Corporation, Cockeysville, Md., a corporation of Maryland
Continuation of applications Ser. No. 213,713, July 31, 1962, and 490,776, Sept. 17, 1965. This application Dec. 8, 1966, Ser. No. 632,116
6 Claims. (Cl. 340—248)

This application is a continuation of our prior application Ser. No. 213,713, filed July 31, 1962, now abandoned, and our prior copending application Ser. No. 490,776, filed Sept. 17, 1965, now abandoned.

This invention relates to ratio comparator arrangements, and particularly to ratio comparator arrangements which are especially useful in detecting overheated wheel bearings, commonly referred to as hot-boxes, on railroad equipment.

The invention is illustrated and described as applied to a hot-box detector system. In utilizing the invention in hot-box detection we rely on the well-founded assumption that the probability of a hot-box occurring simultaneously in opposite wheel bearings of a given axle is so remote as to be negligible, and on the fact that a hot-box is likely to be present when the ratio of the absolute difference between the temperatures at opposite wheel bearings to the smaller of the two temperatures lies in a generally predictable range of about 0.5 to 2.0. The threshold ratio comparator arrangement according to this invention provides a facile manner of comparing these detected signals and providing desired signaling if the signals fall within the comparison range.

Figure 1:
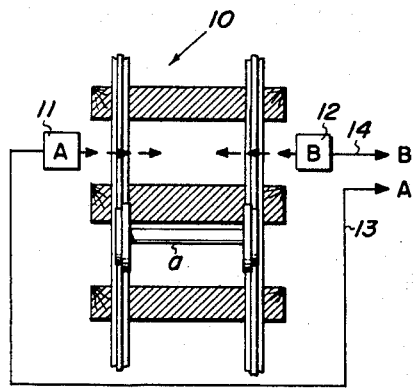
Figure 2:
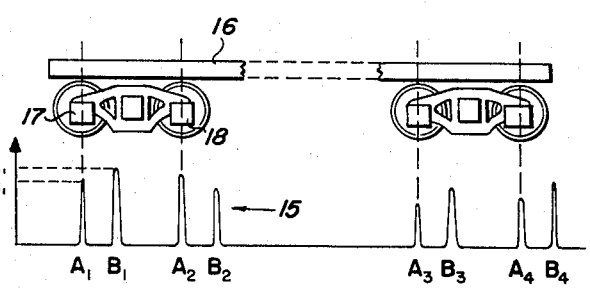
Figure 4:
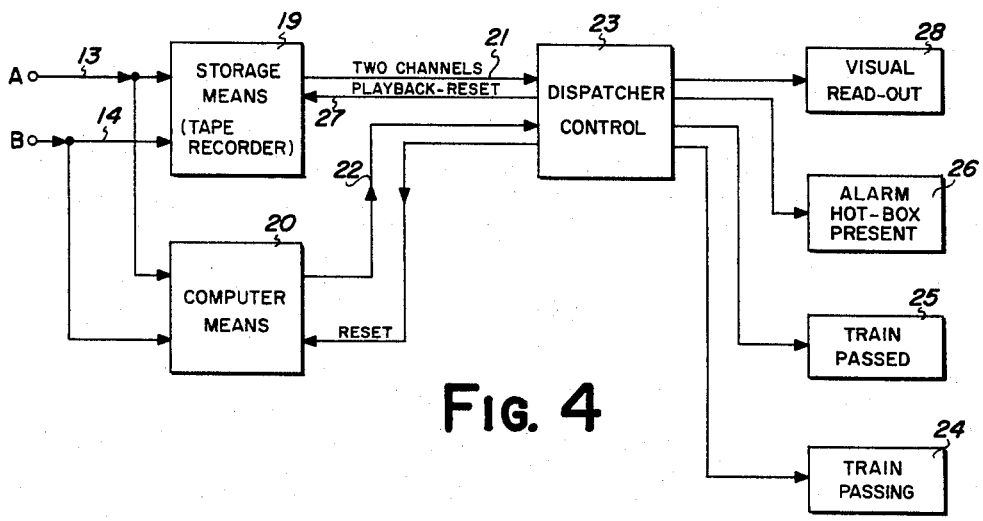
Figure 3:
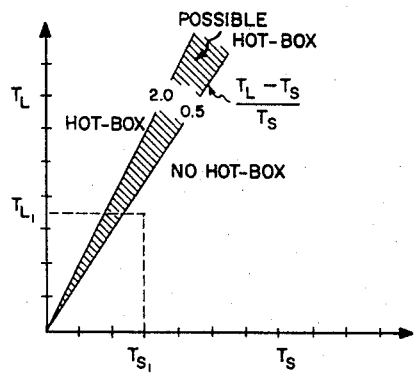
Figure 5:
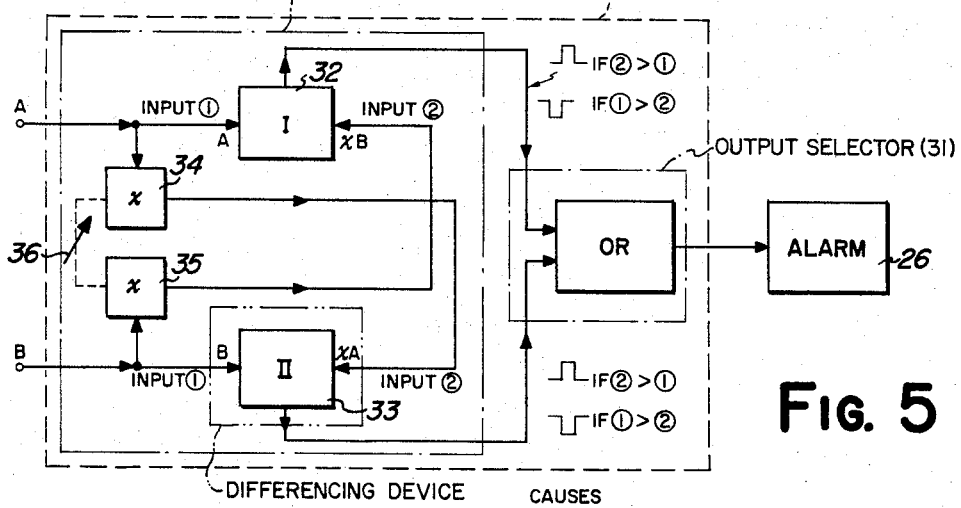
Figure 6:
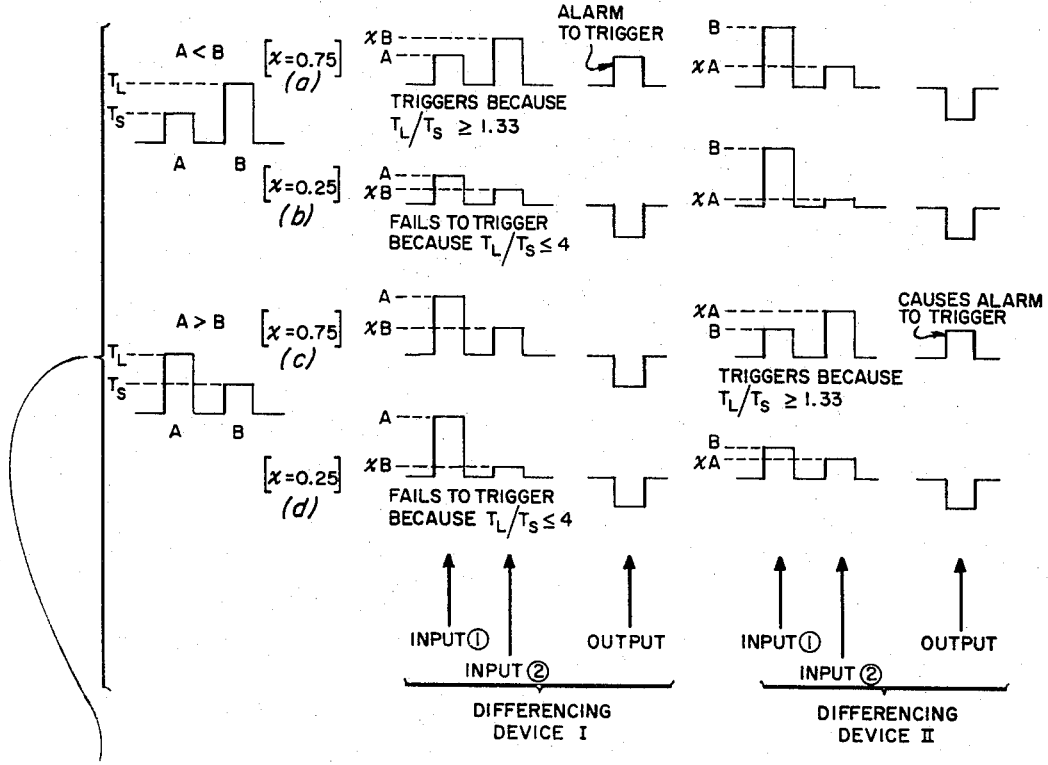

Still other features and attendant advantages will become apparent to those skilled in the art from a reading of the following detailed description of a preferred physical embodiment constructed and practiced in accordance with the invention, taken in conjunction with the accompanying drawings wherein:

FIGURE 1 shows a section of railroad track under surveillance by a pair of infrared (hereinafter designated as IR) detectors capable of measuring the temperatures of wheel bearings of cars passing such section, FIGURE 2 shows a side view of a railroad car and a graph on which a trace associated with the car indicates the temperatures of all of the wheel bearings, FIGURE 3 is a graph of the larger of the temperatures of opposite wheel bearings versus the smaller and showing the regions in which hot-boxes are likely to occur, FIGURE 4 is a block diagram showing the overall system into which the present invention is incorporated, FIGURE 5 is a schematic representation of the threshold ratio comparator means of the block shown in FIGURE 4 and according to the invention, FIGURE 6 is directed to the graphical illustration of a series of signals showing the inputs and outputs of the differencing device of FIGURE 5 and indicating how the latter will trigger an alarm when the ratio of the larger of two signals to the smaller exceeds a predetermined value, FIGURE 7 is a schematic representation of a preferred embodiment of the threshold ratio comparator according to the invention.

In FIGURE 1 there is shown schematically at 10 a section of railroad track and a pair of IR radiation detectors, 11, 12 mounted on opposite sides of the track for producing, for each axle $a$ of a train as the latter passes between the detectors, a pair of signals A, B whose amplitudes are measures of the temperatures of opposite wheel bearings of the axle. The construction and operation of these detectors are well known to those skilled in the art, and since the details form no part of this invention, no further description will be given. Lead 13 connected to detector 11 and lead 14 connected to detector 12, through a 2-channel, or multiplexed communication link, may be connected to a 2-channel recorder which will reproduce simultaneous pulse traces $A_1$, $B_1$, etc., each on a respective one of the two recorder traces. For purposes of clarity of illustration and discussion, pulses $A_1$, $A_2$, $B_1$, $B_2$, etc., are shown in the lower portion of FIGURE 2 in side-by-side spaced relation, thereby illustrating the relative amplitudes $T_L$ and $T_S$ of the respective signal pairs. It will be understood that on a conventional 2-channel recorder the pairs of pulse traces $A_1$, $B_1$, and $A_2$, $B_2$, etc., would normally appear at the same time on their respective trace.

As can be seen from inspection of FIGURE 2, wherein a railroad car is illustrated schematically at 16, a pair of temperature pulses $A_1$, $B_1$, is associated with axle 17; a pair of temperature pulses $A_2$, $B_2$, is associated with axle 18, etc. Temperature pulse $A_1$ is identifiable with the wheel bearing on the left side of axle 17 and temperature pulse $B_1$ is identifiable with the wheel bearing on the opposite or right side of axle 17. In this manner, visual record of the temperature of each wheel bearing of a train can be obtained. Conventionally, this record is inspected by a dispatcher to determine whether a hot-box is present.

From actual visual records like that described above and illustrated in FIGURE 2, two conclusions can be drawn: (1) opposite wheel bearings generally run at somewhat different temperatures, and (2) the absolute value of the temperature of a wheel bearing indicates nothing unless it is known whether the bearing in question is a journal bearing or a roller bearing. The first is due in part to different ambient conditions on opposite sides of a train that might arise because of sun and shadow, and in part to a lack of uniformity between wheel bearings. The second is due to the fact that roller bearings inherently run hotter, much hotter, than journal bearings. Thus, temperature pulses $A_1$, $B_1$ differ in magnitude, and the absolute value of each is not indicative of an excessively hot wheel bearing. As shown in FIGURE 2, temperature pulse $B_1$ is larger than $A_1$, but pulse $A_2$ is greater than $B_2$, etc.

Experience has indicated that when the ratio of the difference between the amplitudes of opposite temperature pulses A, B to the amplitude of the smaller of the two pulses lies within the approximate range of 0.5 to 2.0, an excessively hot wheel bearing is likely to be present, whereas when the ratio is greater than about 2.0, a hot-box is almost a certaintity, and for a ratio below about 0.5 there is probably no hot-box. The selection of any particular critical threshold ratio within or outside this 0.5–2.0 range is a matter of personal judgment and experience and particular bearing environment conditions. Thus, provision is made for selectively setting this critical threshold ratio as desired. FIGURE 3 illustrates this ratio plotted as a function of the two detected temperatures with the questionable region shown by the shaded area. Since the illustrative point designated by the coordinates $T_{L_1}$, $T_{S_1}$ (identified with temperature pulses $B_1$ and $A_1$ respectively) lies in the safe region, there is little likelihood that a wheel bearing associated with axle 17 is overheated. Once this concept of determining when a hot-box is likely to occur is appreciated, the apparatus of FIGURE 4 can be used to provide an automatic indication to a dispatcher when a hot-box is likely to be present. In this way, a visual record of a train need be examined by a dispatcher only if the above criterion is met.

As shown in FIGURE 4, the signals at leads 13 and 14 are stored on tape in storage means 19. Such signals are also put into threshold ratio comparator computer means 20 according to the invention, which produces an alarm when the values of the temperatures pulses are such that:

$$0.5 \leq \frac{T_L - T_S}{T_S}$$

or $$\leq \frac{T_L}{T_S} - 1$$

or $$1.5 \leq \frac{T_L}{T_S}$$

Connection 21 from storage means 19 and connection 22 from computer means 20 lead to a control panel 23 at the dispatcher's office.

From the presence of signals A and B, the computer means detects the presence of a train on section 10 of the track under surveillance by detectors 11 and 12, and causes actuation of train passing indicator 24 at the dispatcher's office. The threshold ratio comparator computer means continuously computes the desired ratio, and as long as it is less than the critical value, the computer means will not actuate alarm 26. When the train passes section 10, train passed indicator 25 is actuated. Indicators 24 and 25 thus inform the dispatcher when a train is passing section 10 and when it has passed. If no hot-box is present, the dispatcher may reset the indicators in preparation for the next train.

If, while a train is passing through section 10, the threshold ratio comparator computer means determines that a ratio of detector signals exceeds the preselected value indicative of the presence of a hot-box, alarm 26 will be actuated to indicate that the train probably has an overheated wheel bearing. After train passed indicator 25 is actuated, the dispatcher, through connection 27, can cause the signals recorded in storage means 19 to be played back into visual read-out device 28 to obtain thereby a visual record of the bearing temperatures in chart form similar to that shown at 15 in FIGURE 2. From this record, the dispatcher can decide whether a hot-box is actually present. In this manner, only the record of those trains likely to have an overheated wheel bearing need be visually examined by a dispatcher. If alarm 26 is not actuated, the dispatcher may erase the signal recorded in storage means 19 in preparation for the next train.

FIGURE 4 thus shows a railroad hot-box detecting system which is usable with a pair of IR radiation detectors mounted on opposite sides of a section of track for producing, when a train passes between the detectors, pairs of signals A, B whose amplitudes are measures of the temperatures of opposite wheel bearings of the train. Storage means 19 records each pair of signals and visual readout means 28 can be used to visually display each pair of signals for permitting visual inspection of their amplitudes. Control 23 is selectively operable for causing storage means 19 to play back the recorded pairs of signals into readout means 28. Threshold ratio comparator computer means 20 is responsive to the pairs of signals for (1) actuating train passing indicator 24 to call attention to the fact that a train is under inspection; (2) actuating alarm 26 to call attention to the fact that difference in amplitudes between each signal of a pair to the amplitude of the smaller of the two exceeds a preselected value indicative of the presence of a hot-box; and (3) actuating train passed indicator 25 after the train has passed section 10.

Before describing in detail the construction of the illustrated embodiment of the threshold ratio comparator computer means 20 according to the invention, it should be understood that the ratio that is indicative of the probable presence of a hot-box can be expressed in an equivalent manner, namely:

$$1.5 \leq \frac{T_L}{T_S} \leq 3.0$$

The latter ratio range is the same as $$1.5 \leq \frac{T_L - T_S}{T_S} \leq 2.0$$

Thus, it is sufficient to determine when the ratio of the larger of the two signals to the smaller is greater than the particular selected threshold value lying between about 1.5 and 3.0. This is accomplished with the threshold ratio comparator arrangement according to the invention, as shown illustratively in FIGURE 5.

Threshold ratio comparator computer means 20 according to the invention includes computer device 30 and output selector 31. Device 30 includes a pair of differencing devices 32, 33 and a pair of ganged voltage divider networks 34, 35. As used in this description, the term "differencing device" is meant to be a device having a pair of input terminals or leads and an output terminal or lead such that when signals of different amplitudes are applied to the input terminals, the polarity of the output signals at the output terminal depends upon which of the two input signals is larger. An example of such a device is a differential amplifier wherein the output is proportional to the difference between the two inputs.

"A" pulses are applied to input (1) of differencing device I and "B" pulses are applied to input (1) of differencing device II. Voltage divider network 34 permits a preselected fraction of each "A" pulse to be applied to input (2) of device II and the same fraction of each "B" pulse to be applied to input (2) of device I. Networks 34 and 35 may be simultaneously adjusted through control 36 in order to keep the fraction of each detector pulse constant as the fraction is varied. As shown in FIGURE 5, the amplitude of the pulse at input (2) to differencing device I is the product xB; while the amplitude of the pulse at input (1) to device II is B, and the amplitude of the pulse at input (2) to device II is the product xA. If input (1) is greater than input (2) of the devices, the output from each of I and II is of a polarity opposite to the polarity of the output if input (2) is greater than input (1).

The effect of the variable "x" can be understood by referring to FIGURE 6. If $A \neq B$, then either $A < B$, or $A > B$. These two cases are illustrated in FIGURE 6 with two values of the variable "x." Suppose A and B are both positive, and $A < B$ such that B is twice as large as A, and $x = 0.75$. It is apparent from FIGURE 6(a) that input (2) of device I is greater than input (1) since 75% of B is still larger than A. However, since $B > A$, B is also greater than 75% of A, and input (1) of device II is greater than input (2). As a result, device I provides a positive pulse while device II produces a negative pulse. If output selector 31 is responsive only to the polarity of pulses of the output of the differencing devices that arise when input (2) is greater than input (1), namely positive pulses, alarm 26 will be triggered. Suppose now that networks 34 and 35 were adjusted such that $x = 0.25$. Now, as seen in FIGURE 6(b), input (1) of device I is greater than input (2) because 25% of B is less than A (when $B = 2A$); and input (1) of device II is also greater than input (2). Hence, when $x = 0.25$ and $B = 2A$, the outputs of both devices are both negative, and selector 31 will not respond, thereby preventing triggering of alarm 26. From the above description, it can be seen that when $x = ¾$, the alarm will be triggered whenever $T_L/T_S \geq 4/3$, and when $x = ¼$, the alarm can be triggered only when $T_L/T_S \geq 4$.

The case when $A > B$, for the same value of $x$, is illustrated in FIGURES 6(c) and 6(d). In this manner, threshold ratio comparator computer means 20 is responsive to detector signals A and B of different amplitudes for producing an alarm signal when the ratio of the amplitudes exceeds a value determined by the inverse of the fraction of signals derived from networks 34, 35. If a value of $T_L/T_S \geq 1.5$ is indicative of a hot-box, then networks 34, 35 would be adjusted until $x=\frac{2}{3}$.

A specific embodiment of the threshold ratio comparator computer means and the associated equipment shown in FIGURES 4 and 5 is illustrated in FIGURE 7. Lead 13 applies pulses from detector 11 to the base of emitter follower Q1, and lead 14 applies pulses from detector 12 to the base of emitter follower Q2. The use of the emitter followers permits proper impedance matching of the computer means with the detectors. Potentiometers 34 and 35 are ganged so that the fraction of a pulse at lead 13 applied to the base of emitter follower Q8 is the same as the fraction of a pulse at lead 14 applied to emitter follower Q5. Differencing devices 32, 33 here take the form of differential amplifiers with the output of emitter follower Q1 applied to the base of Q3 (one input of amplifier 32) and the output of emitter follower Q5 applied to the base of Q4 (the other input of amplifier 32). Similarly, the output of emitter follower Q2 is applied to the base of Q6 (one input of (amplifier 33) and the output of emitter follower Q8 is applied to the base of Q7 (the other input of amplifier 33).

When a pulse of amplitude A is applied to lead 13 and a pulse amplitude B is applied to lead 14, the amplitudes of the signals at the bases of Q3 and Q4 of device 32 are essentially A and xB respectively, and the amplitudes of the signals at the bases of Q6 and Q7 of device 33 are essentially B and xA respectively. If $A<xB$, the output of device 32 at lead 40 is proportional to $-(A-xB)$, a positive signal if both A and B are positive; while if $A>xB$, the output is a negative signal. Similarly, if $B<xA$, the output of device 33 at lead 41 is proportional to $-(B-xA)$, a positive signal if both A and B are positive; while if $B>xA$, the output is a negative signal. As described above, if $x$ were set at $\frac{2}{3}$, a positive pulse would appear in either lead 40 or 41 whenever the ratio of the larger of the signals A and B to the smaller exceeds 1.5.

Voltage divider network 42 maintains node 43 at substantially the same potential as the collectors of Q3 and Q6. As a result, diodes 44, 45 of output selector 31 act as an "or" gate that accepts only positive pulses. Thus, a voltage change occurs at node 43 only when either $A<xB$ or $B<xA$, such change being in the form of a positive pulse. When such pulse occurs, it is applied to emitter follower Q9, which isolates the output of selector 31, appearing at the emitter thereof, as a positive pulse substantially coincident with the positive pulses at the bases of Q3 and Q6.

Diodes 46, 47 and 48 function as an "and" gate so that the voltage at node 49 changes only when all of these three diodes do not conduct. Non-conduction will occur whenever positive pulses are present at least 13 and 14 and when the ratio of the amplitudes of the larger of such pulses to the smaller exceeds the inverse of the setting of potentiometers 34 and 35. If such setting is $\frac{2}{3}$ or less, these events occur only when both detectors 11 and 12 are operating and when one of the wheel bearings is likely to be overheated. This technique is used to prevent an indication of the presence of a hot-box when one of the detectors is faulty and fails to produce a signal when a train passes.

The negative voltage at the emitter of Q10 maintains this amplifier cut-off until a positive pulse appears at node 49. When Q10 conducts, current flows through coil 50 of relay K4 causing holding contact arm 51 to move from its position shown in the drawing into engagement with grounded contactor 52 whereby voltage $E_2$ is impressed across coil 50 after the voltage at node 49 returns to its quiescent value and Q10 cuts off. Simultaneously, contact arm 53 moves with engagement with contactor 54 whereby voltage $E_2$ is impressed across alarm lamp 26. Thus, energization of relay K4 effects energization of lamp 26, and an indication is provided that one of the wheel bearings, identifiable with the pulses that produced signals A and B, is overheaded.

To provide an indication that a train is passing section 10, the base of Q3 (node 55) is connected to movable contactor 56 of relay K3. The first output from detector 11 (initial pulse A) due to the passage of the first wheel bearing through the field of view of the detector is amplified by Q11 and Q12 to provide a current pulse which passes through relay coil 60 of K1 causing contactor arms 61 and 62 to engage contacts 63 and 64 respectively.

K1 remains energized only during the existence of the initial pulse from detector 11. However, during that time, arm 62 engages contact 64 and voltage $E_2$ is impressed across coil 65 of relay K2, thereby causing contactor arms 66 and 67 to engage contacts 68 and 69 respectively. Engagement of arms 67 with contact 69 serves to hold in relay K2 after the initial pulse ends and arm 62 moves back to the position shown in FIGURE 7. Thus, voltage $E_2$ is also impressed across lamp 24 which indicates that a train is passing section 10. Engagement of arm 66 with contact 68 would also impress voltage $E_2$ across lamp 25 which would indicate that the train has already passed since contactor arm 70 of relay K3 is normally engaged with contact 71.

However, during the initial pulse and while arm 61 is engaged with contact 63, voltage source $E_4$ is applied to capacitor 57 at the base of Q14 causing the capacitor to charge up and Q13 and Q14 to conduct and produce a current pulse until the voltage at node 59 causes Q14 to cut off. The value of capacitor 57 is chosen such that the voltage at node 59 is sufficient to cause Q14 to conduct for a period of time approximately equal to the time between successive signals generated by the slowest train for which the system is designed passing through section 10. Thus, current flows for this period through coil 72 of relay K3 causing contactor arm 70 to disengage contact 71. This serves to prevent $E_2$ from being applied to indicator 25 until the train has passed through section 10. However, if a train longer than usual passes through section 10 at a slower than usual speed such that capacitor 57 completely discharges, K3 would be deenergized causing arm 70 to contact 71 and lamp 25 will be lit until the next pulse from detector 11 arrives at node 55. As above described, Q11 and Q12 would again amplify the next pulse causing capacitor 57 to recharge and the cycle to repeat. If this occurs, lamp 25 will blink. However, as a train passes through section 10, the time during which the lamp 25 will be lit compared to the time during which the lamp remains extinguished will be very small.

After this occurs, with or without alarm 26 being actuated, the threshold ratio comparator computer means may be reset by opening pushbutton 75. This removes $E_2$ from lamp 26, and causes relay K2 to be de-energized, extinguishing train passing lamp 24. K1 and K3 are also de-energized, thereby extinguishing lamp 25. The computer means is now reday to handle another train.

In summary of the purpose and function of the various relays K1–K4, the relay K1 is energized by amplified pulses from one detector and in turn energizes relay K2 and also causes application of a charge to capacitor 57. This charge on capacitor 57 causes relay K3 to be energized, thereby preventing lamp 25 from being energized by contact 68 of relay K2. Energization of relay K2 energizes "train passing" indicator lamp 24 and applies voltage to "train passed" indicator lamp 25. Relay K3 prevents relay K1 from being energized on each detector pulse and causes lamp 25 to be energized when relay K3 is de-energized. Energization of relay K4 effects energization of lamp 26, giving the indication of a possible hot-box.

The application of the threshold ratio comparator computer means described above contemplates that the fraction of the two signals applied to like inputs of the two differencing devices are equal. However, for some purpose it may be desirable if potentiometers 34 and 35 were not only individually adjustable, but adjusted to different values such that the fraction of two signals applied to like inputs of the two differencing devices are not equal. For this reason, the term "substantially equal" is used to relate the fractions of the two signals and is intended to include both situations.

While the invention has been illustrated and described with respect to one illustrative embodiment, it will be readily apparent to those skilled in the art that the invention may be applied in other arrangements than hotbox detector systems, and that various modifications and improvements can be made without departing from the scope and spirit of the invention. Accordingly, it is to be understood that the invention is not to be limited by the specific illustrative embodiment, but only by the scope of the appended claims.

That which is claimed is:

1. Threshold ratio comparator apparatus for comparing and indicating the relationship between a pair of applied signals which differ in amplitude, comprising:
   a computer device having either positive or negative output as a function of the ratio of two signal inputs thereto being above or below a selected threshold ratio value;
   said computer device comprising:
      first and second differencing devices each having first and second input leads and an output,
      first and second voltage dividers,
      said first voltage divider being operatively connected between said first input lead of said first differencing device and said second input lead of said second differencing device,
      said second voltage divider being operatively connected between said first input lead of said second differencing device and said second input lead of said first differencing device;
   polarity-sensing means responsive to the output of said computer device and effective to produce a signal when an input thereto from said computer device has a selected polarity, said polarity-sensing means comprising:
      an AND device having a plurality of input means and adapted to produce an output signal only when the signals applied to the input means have the same polarity,
      said first inputs to said differencing devices being operatively connected to respective ones of said input means of said AND device,
      an OR device adapted to produce a signal when an input thereto from said computer device has a selected polarity and having an output operatively connected to a separate one of said input means of said AND device and a plurality of input means,
      said outputs from said differencing devices being operatively connected to respective ones of said input means of said OR device, and
   indicator means responsive to signals from said polarity-sensing means.

2. Threshold ratio comparator apparatus according to claim 1, wherein said first and second voltage dividers are variable for adjustment of the respective proportions of the input signals applied to said second input leads of the respective said differencing devices.

3. Threshold ratio comparator apparatus according to claim 2, wherein said first and second variable voltage dividers are ganged for simultaneous single adjustment.

4. Threshold ratio comparator apparatus according to claim 3, said first and second differencing devices each comprising a differential amplifier.

5. Threshold ratio comparator means according to claim 4, wherein said OR device comprises first and second diodes being respectively connected to the output of said first and second differencing devices and at a common junction through a resistor to a referenced potential.

6. Threshold ratio comparator apparatus according to claim 5, wherein said AND device comprises three diodes connected by a resistor to a common source of potential and connected respectively to the input of said first and second differencing devices and the junction between the pair of diodes and resistor of said OR device.

References Cited

UNITED STATES PATENTS

| | | | |
|---|---|---|---|
| 3,100,097 | 8/1963 | Woltersdorf | 246—169 |
| 3,108,772 | 10/1963 | Pelino | 246—169 |
| 3,169,735 | 2/1965 | Sinclair | 246—169 |

JOHN W. CALDWELL, *Primary Examiner.*

D. M. MYER, *Assistant Examiner.*

UNITED STATES PATENT OFFICE
CERTIFICATE OF CORRECTION

Patent No. 3,412,389                                                        November 19, 1968

Carroll M. Barrack et al.

It is certified that error appears in the above identified patent and that said Letters Patent are hereby corrected as shown below:

Column 2, line 51, "certaintity" should read -- certainty --. Column 4, line 7, "1.5" should read -- 0.5 --. Column 5, line 19, "(amplifier" should read -- amplifier --. Column 6, line 2, "overheaded" should read -- overheated --; line 58, "reday" should read -- ready --.

Signed and sealed this 17th day of March 1970.

(SEAL)
Attest:

Edward M. Fletcher, Jr.                                      WILLIAM E. SCHUYLER, JR.
Attesting Officer                                                   Commissioner of Patents